(12) United States Patent
Kirschey

(10) Patent No.: US 6,953,399 B2
(45) Date of Patent: Oct. 11, 2005

(54) SHAFT COUPLING WITH HIGH TORSIONAL ELASTICITY

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 0 days.

(21) Appl. No.: 10/636,969

(22) Filed: Aug. 7, 2003

(65) Prior Publication Data

US 2004/0058735 A1 Mar. 25, 2004

(30) Foreign Application Priority Data

Aug. 8, 2002 (DE) .......................... 102 36 295

(51) Int. Cl.[7] .............................................. F16D 3/52
(52) U.S. Cl. .......................................... 464/92; 464/87
(58) Field of Search .............................. 464/17, 88, 92, 464/93, 87, 96

(56) References Cited

U.S. PATENT DOCUMENTS

| | | | | |
|---|---|---|---|---|
| 2,299,029 A | * | 10/1942 | Nutt ............................. | 464/92 |
| 2,556,624 A | * | 6/1951 | Macbeth et al. ............. | 464/92 |
| 4,563,166 A | * | 1/1986 | Walter et al. ................ | 464/96 |
| 4,664,642 A | | 5/1987 | Kirschey | |
| 4,708,514 A | * | 11/1987 | Walter et al. ................ | 464/92 |
| 4,929,115 A | * | 5/1990 | Lunke et al. ................ | 464/93 |
| 5,066,263 A | * | 11/1991 | Lunke et al. ................ | 464/96 |
| 6,234,903 B1 | * | 5/2001 | Walter et al. ................ | 464/17 |
| 6,582,148 B1 | * | 6/2003 | Walter et al. ................ | 464/17 |
| 2002/0082091 A1 | * | 6/2002 | Walter et al. ................ | 464/92 |

FOREIGN PATENT DOCUMENTS

| | | |
|---|---|---|
| DE | 34 34 722 | 4/1986 |
| DE | 36 16 232 | 11/1987 |
| DE | 198 08 035 | 10/1998 |

OTHER PUBLICATIONS

"CENTAX" (Hochdrehelastische Kupplungen Baureihen S/E/D), 88, 12 pages.

* cited by examiner

Primary Examiner—Aaron Dunwoody
(74) Attorney, Agent, or Firm—Herbert Dubno

(57) ABSTRACT

An elastic shaft coupling with high torsional elasticity having segments formed by steel sheet segment plates vulcanized to an elastomeric body and in which blocking elements bridge the radial gaps of the segments of each coupling half so as to brace the plate segments against axial deformation. All of the elastomeric bodies are vulcanized to the segments or to rings from which segments are divided in a common vulcanization procedure.

18 Claims, 4 Drawing Sheets

SHAFT COUPLING WITH HIGH TORSIONAL ELASTICITY

FIELD OF THE INVENTION

My present invention relates to a shaft coupling with high torsional elasticity. More particularly, the invention deals with high elasticity shaft couplings for connecting a driving unit, like a diesel engine and especially a diesel engine flywheel with a driven unit like a transmission or generator. In such cases, the diesel engine flywheel is connected to one half of the shaft coupling while the transmission or generator is connected to the other coupling half.

BACKGROUND OF THE INVENTION

Elastic shaft couplings for connecting a drive unit with a driven unit are of course known. The generally annular shaft coupling may be subdivided into segments and each of the segments can include a plate segment forming part of one of the two coupling halves and the plate segments can be connected together by an elastic material which may be bonded to the axial surfaces of the plate segments by vulcanization thereto. The term "axial surfaces" is here used to refer to the surfaces of the segments which face in the axial direction.

Segmented shaft couplings are available in a variety of configurations and these include the shaft couplings of German Patent Document DE 36 16 232 A1 (see especially the ring arrangement 3 thereof) and the segmented coupling of German Patent Document DE 34 34 722 A1.

Segmentation of the coupling enables the coupling to be made from smaller components and can be used whenever one piece coupling half plates or elastomeric members cannot be fabricated in an economical manner or where one piece couplings cannot be mounted in an economical or convenient manner. They are also of advantage wherever replacement of the components are necessary and have been found to be useful wherever the machine parts connected by the shaft coupling cannot be moved apart to enable replacement.

In the past it has been necessary to fabricate the metal segment plates from relatively expensive cast steel in the same manner as flanges were formed. Furthermore, it has been required or desirable to support the coupling at a bearing at a hub, usually via a lateral ring to stabilize the segments during rotation of the coupling against the centrifugal forces which tend to develop in them. Both of these approaches are expensive and hence prior shaft couplings of such types (see especially DE 36 16 232 A1 for such stabilization) have not been considered cost effective in many applications.

OBJECTS OF THE INVENTION

It is, therefore, the principal object of the present invention to provide an improved segmented coupling of high torsional elasticity which is constructed more simply and hence is more cost effective or economical than shaft couplings.

It is another object of the invention to provide an improved shaft coupling which is free from drawbacks of earlier shaft coupling systems.

Yet another object of the present invention is to provide a shaft coupling which has high torsional elasticity, can be manufactured simply and economically and can be used highly effectively between a drive and a driven unit, especially between a flywheel of a diesel engine and a transmission or electrical generator.

SUMMARY OF THE INVENTION

A shaft coupling with high torsional elasticity is provided in accordance with the invention for connecting a drive with a driven unit, the shaft coupling having a first generally annular coupling half connectable to the drive and a second generally annular coupling half connectable to the driven unit, each of the coupling halves comprising a plurality of coplanar plate segments having radial gaps between them, the shaft coupling comprising elastomeric bodies between corresponding plate segments and vulcanized to juxtaposed surfaces of the plate segments, the plate segments being composed of metal sheet having at least main surfaces of the sheet which constitute the axial surfaces thereof formed as nonmachined faces; and blocking elements at the radial gaps coupling the plate segments of each half together across the respective gap and bracing the plate segments against axial deformation.

According to the invention, the segment plates are thin metal sheet, for example steel sheet which can have a thickness preferably ranging from 1 mm to say 25 mm. At least the major surfaces of the sheet which form the axial surfaces of the segment plates are not machined, i.e. are not subjected to chip-removal machining.

The segment plates are coupled together by at least one blocking element and the segment plates according to the invention are braced against one another to counteract axial deformation.

An important advantage of the present invention is that the shaft coupling can be fabricated in a highly economical manner since its metallic parts can be cut from thin steel metal, e.g. by stamping or in another non-machining approach (e.g. laser beam cutting). The expression "thin sheet metal" or "thin sheet" is intended to mean that the metal segment plates have thicknesses which are up to 50% of the wall thickness of conventional cast steel flanges or cast steel segment plates. Since the main surfaces of the segment sheets which constitute the axial surfaces of the segment plates are not machined by a chip removal method the fabrication cost on the one hand is minimized and on the other hand the segment plates are completely free from distortion which can result from heating effects and from internal stresses which cannot be excluded in machining operations. The coupling of the invention utilizing the thin segment plates is therefore not only economical but has technological advantages and eliminates the need for operation subsequent to the stamping or punching operation with which the segment plates are formed.

As far as the blocking elements are concerned, they preferably are connected to individual segment plates and connect the segment plates of each coupling half together by overlapping the other segment plate of the respective coupling half.

More particularly, each of the blocking elements, located at the edge with respect to the peripheral direction of a segment can extend across the respective coupling gap to overlap the neighboring segment plate and preferably can have a notch, recess or groove into which the other segment plate extends so that each blocking element connected to one segment plate straddles the segment plate on the other side of the gap.

Because of the blocking elements which themselves are very simple and economical, the previously used more complex and thus expensive systems for stabilizing the segment plates can be eliminated.

Coupling flanges of steel sheet are themselves already known in annular elastic couplings. An example can be found in the CENTAX® couplings of the present patent application owner which have been supplied in large number for at least a decade. These elastic couplings are comprised substantially of two concentrically arranged annular flanges with elastic rubber ring coupling elements vulcanized between the flanges and bonded to them. The transfer of torque between the parts of the coupling is effected by screws or like connectors whereby one flange at the outer diameter and the other flange at the inner diameter can be bolted to the drive unit and the driven unit, usually a flywheel and hub. The flanges in the form of one piece steel rings enable a simple and economical fabrication and guarantee, in addition high precision and good balance for low weight and low inertial torque transfer.

According to a further feature of the invention, the blocking elements which are located in the region of the edge of a segment and extend across the gap to straddle the neighboring segment plate and brace each other against axial deformation are engageable with one another in the peripheral direction to transfer angular force from one to the other.

By contrast with the lateral ring of a coupling of the type described in German patent document DE 36 16 232 A1, supported via a rotary bearing on the hub and which stabilizes the segments against the centrifugal forces which arise, the invention provides blocking elements which in the peripheral direction of the coupling enable the segment plates to interlock but also prevent axial deformation so that the plates cannot bend or buckle, relative to one another. Such blocking elements can have very simple constructions as will be developed below.

According to a further feature of the invention, the segment plates and the elastomeric or rubber coupling bodies are vulcanized together.

In conventional segmented couplings the individual segments, formed by two segment plates and the elastomeric bodies between them, are vulcanized together. The vulcanizing tools can thus be comparatively simple.

With the invention, however, the segments of a coupling were all formed under the same fabrication conditions so that each elastomeric element has the same quality and the same elasticity as each other element of the coupling and the coupling as a whole has significantly greater homogeneity or a homogeneity which could not be achieved with earlier couplings with respect to elastic and dynamic properties. In accordance with this aspect of the invention, all of the segment-shaped elastomeric bodies of the coupling are vulcanized in one common vulcanizing operation to rings of metal which are later subdivided into segments or into segments subdivided from rings by laser cutting.

Advantageously and in accordance with a feature of the invention, each blocking element has at least two lugs forming a lug arrangement in which each lug is affixed to one segment plate and partly engages over the neighboring segment plate in the peripheral direction. The blocking lugs themselves can be simple plates or sheets and thus do not have to have any special requirements in a structural sense. The blocking element that is comprised of two lugs may form one of a pair and both can be affixed to one segment plate and can straddle both sides of the neighboring segment plate in the axial direction.

However, in a preferred embodiment, the two blocking elements of a mating pair can each be affixed to one of the two neighboring segment plates, can span the radial gap between them and, on the opposite segment plate can straddle the opposite axial faces. The two blocking elements may engage one another in the peripheral direction for torque transfer purposes as soon as there has been a certain amount of yielding of the elastic elements.

The lugs of the blocking elements can be affixed to the same axial side of the respective segment plates or on opposite axial sides thereof and in accordance with a further feature of the invention, the blocking elements may be two plates affixed to one segment and straddling the other. Any means of attachment of the blocking elements may be used and preferably such means can include welding, riveting, bolting, or the like. When removable bolts and nuts are used, additional means can be provided, for example, pins with a clearance fit can be used to prevent rotation of the blocking elements at the edge of the respective segment.

The lugs or plates forming the blocking element may be circular arc segments and can have inner or outer peripheries which are flush with the corresponding peripheries of the respective segment plates.

Whether the lug is placed close to the inner periphery or the outer periphery will depend on the space available, whether the surfaces of the segment plates in the region are planar or bent inwardly or outwardly or in an axial direction, depending on the coupling design. As a result, the blocking elements will be provided on the side of the coupling half concerned which is opposite the force application in the radial direction.

It has been found experimentally that a coupling in accordance with the invention is highly advantageous when it consists of only two segments. However, this should be considered only the minimum number of segments which can be provided in accordance with the invention. In practice, the number of segments which can be provided in accordance with the invention will depend on the load and the dimensions of the coupling as a whole.

In the method aspects of the invention, the metallic parts forming the segment plates are initially formed in respective closed rings. The elastomeric coupling body in segment shapes are then provided between the annular plates vulcanized to the metal rings, whereupon the segments are subdivided from one another in the gaps between the coupling body segments.

In this case the vulcanization is effected in the intermediate assembly as an annular body.

Alternatively, the metal parts of the segments, namely the plates, are initially provided as closed rings, subdivided into individual segment plates and all of the segment plates or the couplings are vulcanized together to the respective elastomeric segments. In both of these methods, the closed rings initially can be formed from steel sheet and can be subdivided by means of laser beam cuttings so that at least the mean surfaces of the sheets which form the axial faces of the segment plates need not be machined, i.e. processed by a chip-removal operation.

The fabrication processes are likewise relatively inexpensive and can provided a highly uniform reproducible product at a minimum cost.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
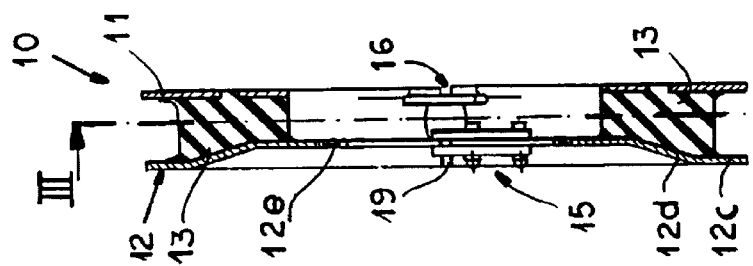
FIG. 2 is a cross sectional view taken along the line II—II of FIG. 1.

As can be seen from FIG. 2, a shaft coupling 10 in accordance with the invention can comprise a first planar coupling flange 11 and a second axially dished coupling flange 12 which can comprise a planar ring 12c, a frusto-conical intermediate portion 12d and a planar hub portion 12e, between which elastomeric coupling bodies 13 are vulcanized.

Figure 3:
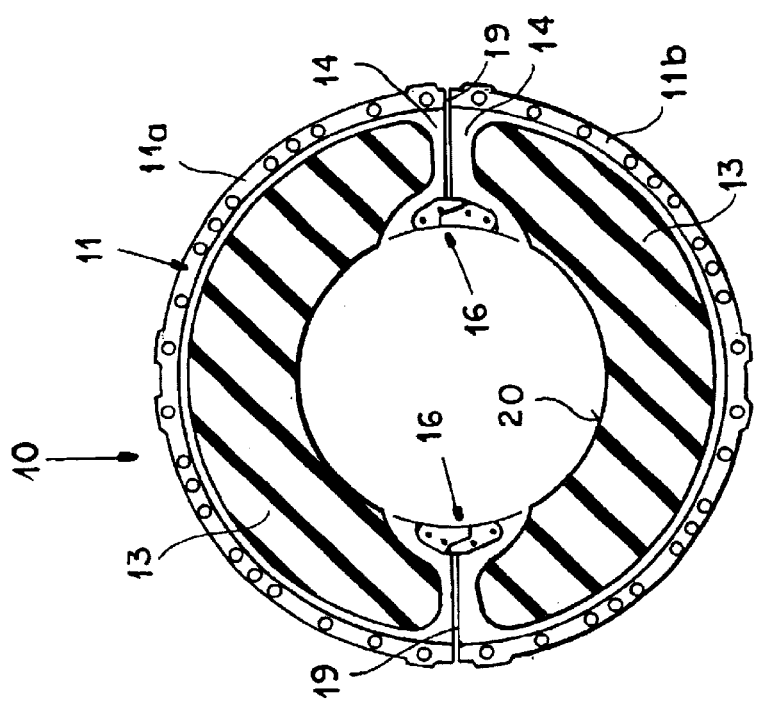
FIG. 3 is a radial section taken along the line III—III of FIG. 2.
Figure 1:
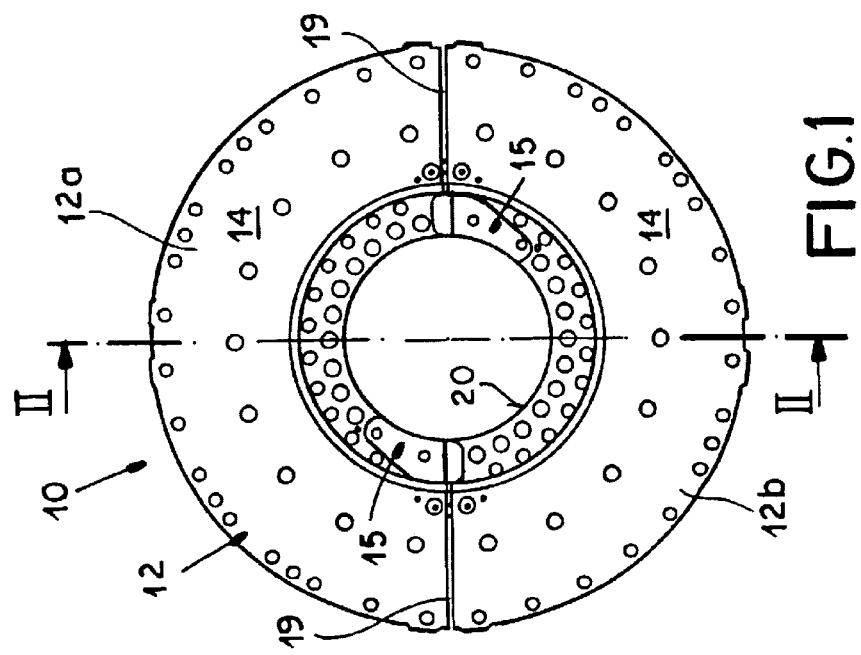
FIG. 1 is an axial end view of elastic shaft coupling in accordance with the invention.

The flanges 11 and 12, which can be seen to be segmented in FIGS. 1 and 3, are originally formed as annular sheet steel members and are shaped by stamping or punching and subsequently subdivided by laser cutting so that neither of these flanges nor the segment plates from which they are fabricated, need to be machined, especially on their surfaces facing in the axial direction, i.e. their respective axial faces.

In the shaft coupling itself, the coupling flanges 11 and 12, therefore, are not present in their original circular or annular ring shapes but rather in the form of ring segments 11a, 11b or 12a, 12b.

In the embodiment shown in FIGS. 1–3, the coupling consists of only two somewhat semicircular segments, each of which consists of two segment plates 11a, 12a or 11b, 12b, and a respective and generally semicircular segmental elastomeric body vulcanized between the two segment plates. While the illustrated coupling, therefore, has only two such segments, it is also possible to provide a larger number of segments for each coupling.

The coupling shown in FIGS. 1–3, therefore, comprises a total of four metallic flange elements which have been designated as segment plates and the reference numeral 14 has been used to refer to segment plates generally. Each of the segment plates 14 is comprised of any sheet metal of a quality steel, for example, a stainless steel. The term "thin" when referring to the thin sheet metal from which the segment plates 14 are constituted is intended to mean a thickness significantly less than the thickness of the flanges used heretofore in segmented couplings and preferably no greater than 50% of the thickness of such flanges. Furthermore, differing from conventional flanges in shaft couplings, these sheet metal flange plates are not machined or subjected to a chip removal processing along their axial surfaces. Any cutting is confined to the inner and outer peripheral edges and the edges of the segment plates defining the radial gaps between the segments.

Since the segment plates are not annular and are relatively thin, the invention provides that blocking elements 15 or 16 are provided on opposite sides of the segment plates to brace the segment plates relative to one another in the axial direction.

As can be seen from FIGS. 1–3, moreover, the blocking elements 15 which may be provided between neighboring segment plates will generally take up more space than the blocking elements 16. The blocking elements 16, moreover, enable the coupling to be flatter in the axial direction and require a reduced degree of dishing of the segment plates 14 forming the flange 12. The flange element 11 can be completely planar as has been noted to allow it to be bolted or otherwise affixed directly to the flywheel of an engine.

Details of the blocking elements 15 and 16 can be seen in FIGS. 4 and 5 and FIGS. 6 and 7, respectively.

Figure 4:
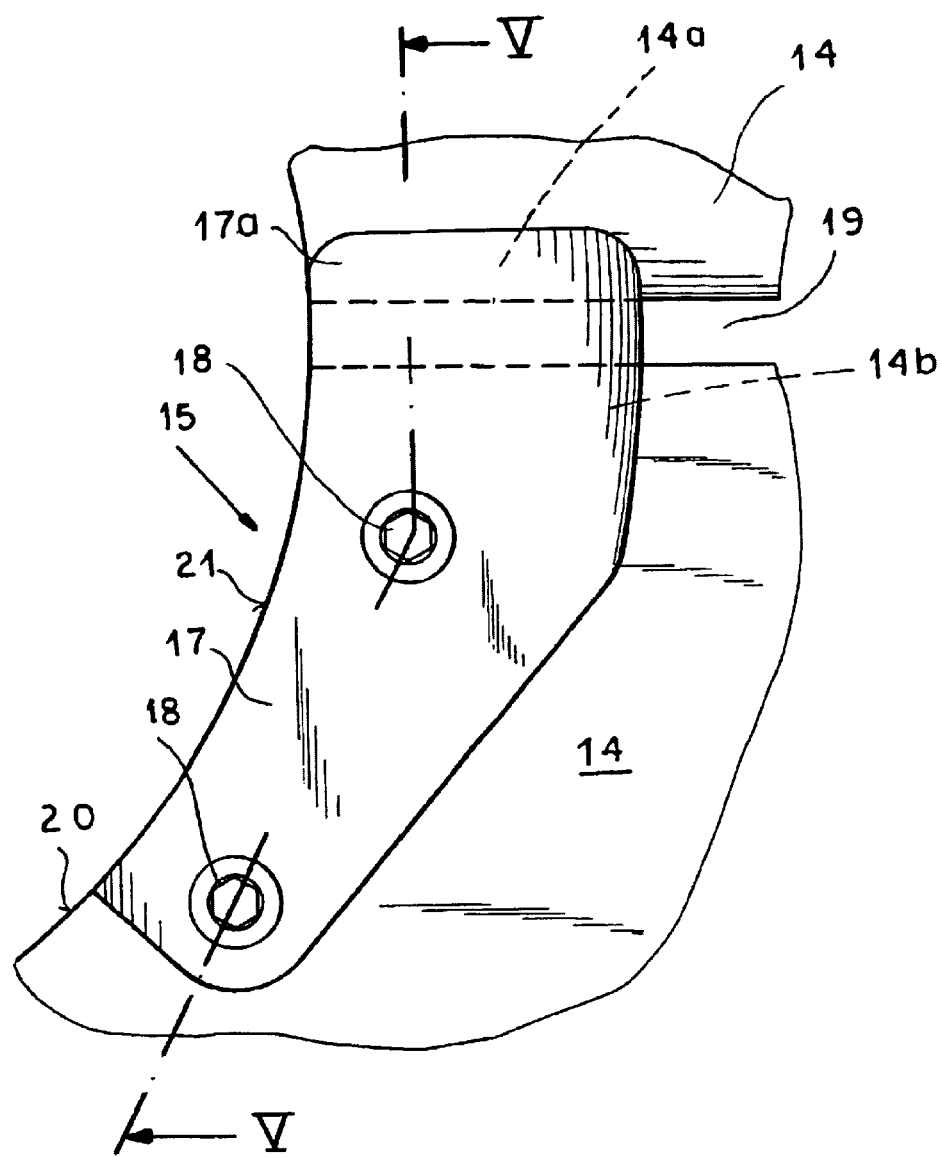
FIG. 4 is an enlarged detail view of a first blocking element for preventing relative axial movement of two mutually neighboring segments.
Figure 5:
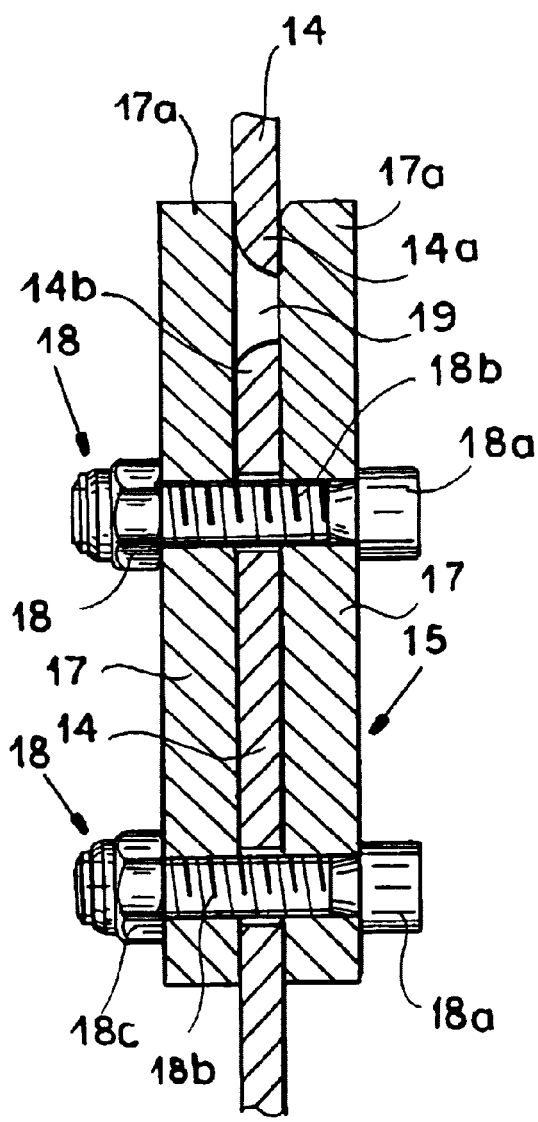
FIG. 5 is a cross sectional view taken along the line V—V of FIG. 4.

The blocking elements 15 shown in FIGS. 4 and 5 are formed from two mirror-symmetrical and otherwise identical flat lugs or plates 17, especially steel plates. The two lugs 17 forming one blocking element 15 are coextensive and are connected by two bolts 18. The bolts 18 have heads 18a (FIG. 5) which can form hexagonal sockets for a hexagonal key and threaded shafts 18b to which locking nuts 18c are affixed.

The lugs 17 have extensions beyond their bolted portions which cross the radial gap between neighboring segment plates 14 and straddle the segment plate 14 to which the lugs are not bolted, thereby bracing the two plates 14 against axial forces. The radial gap 19 is defined between rounded edges 14a and 14b of the two neighboring flange plates 14. Thus the lugs project beyond the edge 14b of the flange plate 14 to which they are attached and overlap the axial faces of the flange plate 14 whose plate 14a defines the other side of the radial gap 19.

The lugs 14 are practically circular arc segments and have peripheral edges 21 which conform and are flush with the inner peripheral edge of the segment plates 14. Of course, the lugs 17 can be provided along the outer periphery if desired, in which case the outer edges of the plates will conform to the peripheral edge of the segment plates 14.

Since the coupling of this embodiment consists of two segments, two blocking elements 15 are provided across each of the radial gaps 19.

Figure 7:
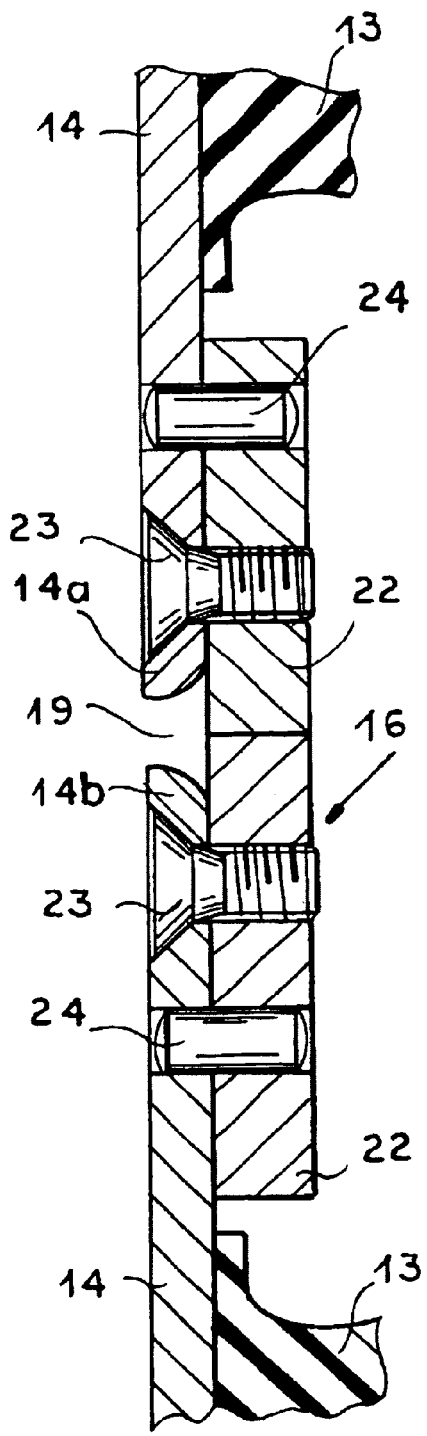
FIG. 7 is a cross sectional view taken along the line VII—VII of FIG. 6.
Figure 6:
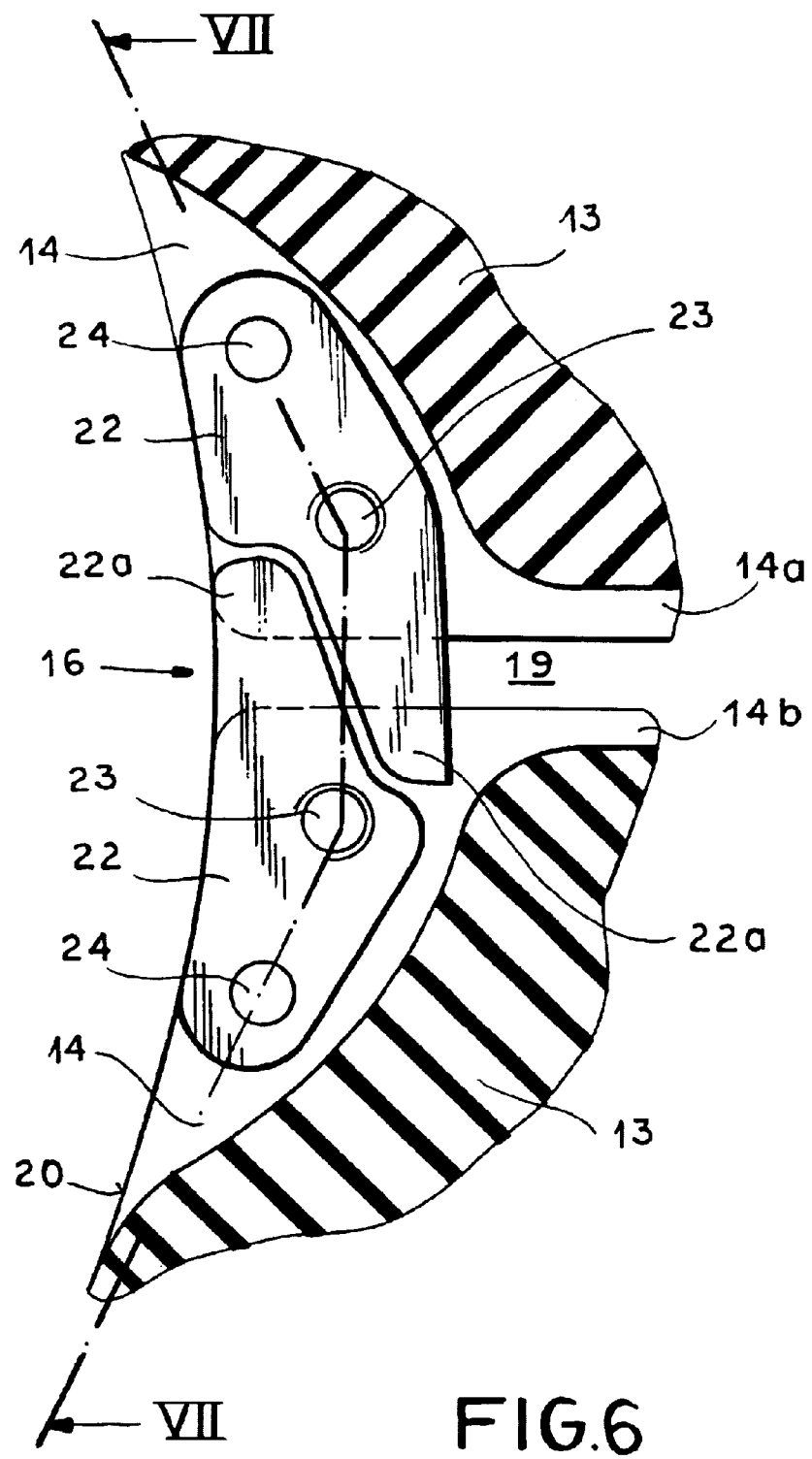
FIG. 6 is a view similar to FIG. 4 but illustrating another configuration of a blocking element according to the invention.

On the other side of the coupling, the segment plates 14 are also braced against one another with corresponding blocking elements or the blocking elements 16 which are of flatter configuration and which have been shown in greater detail in FIGS. 6 and 7.

The blocking device 16 also comprises two lugs 22. The lugs 22 however differ from those of the blocking element 15 in that they are not both attached to the same segment plate 14 but rather one is disposed on one of the segment plates while the other is affixed to the other segment plate 14. Preferably, however, both are provided on the same axial side.

One part of each of the lugs 22 is affixed to the respective segment plate 14 by screws 23 and is held from pivoting by a pin 24 which has a clearance fit in a lined hole of the lug 22 and the respective segment plate 14. The lugs have projecting portions 22a which reach across the radial gap 19 and overlie the other segment plate 14. Thus each projecting portion 22a extends across the gap 19 defined by the two radial edges 14a, 14b. This contrasts with the straddling arrangement of the projecting portion 17a of the lug 17 of FIGS. 4 and 5. The screws 23 are countersunk screws in this embodiment to maintain the flat configuration.

As is also visible from FIGS. 6 and 7, the edge zones of the elastomeric bodies 13 are set back by a short distance from the edges of respective segment plates 14 and in this setback region the blocking element or device 16 is provided.

As noted, the lugs 22 can be provided along the outer or inner peripheries of the segment plate and in the embodiment shown in FIGS. 6 and 7 are disposed along the inner periphery flush with the edge 20. As also can be seen from FIGS. 6 and 7, the projecting portions 22a can be so interfitted (FIG. 6) that the segment plates 14 not only brace each other against axial deformation but the lugs 22 can engage one another in the peripheral direction to transfer torque once the gap 19 has narrowed sufficiently.

As has been described, the metal elements of each coupling half are initially a single ring and can be vulcanized as a ring to the elastomeric body 13 before the rings are cut through to form the gaps 19 and separate the segment plates by the laser-cutting operation.

Alternatively, the ring is cut through and the elastomeric body is then vulcanized to the segment. In either case the vulcanization can be effected simultaneously for all segments to ensure an optimal uniformity of the elastomeric element and their bonds to the segment plates.

The lugs 22 need not be provided on the same axial side of the segment plates 14 as shown in FIG. 7 but can be located on opposite sides thereof. The embodiment as shown in FIGS. 6 and 7 provide however the flattest configuration of the coupling. Furthermore, the blocking elements on the two sides of the coupling need not be of different types. For example the blocking elements of type 15 may be provided on both coupling halves or, conversely, the coupling element of type 16 may be used on both coupling halves.

In either case the coupling elements occupy space which is provided at the segment plates in the setback region of the elastomeric body so that they do not contribute to an increased overall axial thickness of the coupling.

I claim:

1. A shaft coupling with high torsional elasticity for connecting a drive with a driven unit, said shaft coupling having a first generally annular coupling half connected to said drive and a second generally annular coupling half connected to said driven unit, each of said coupling halves comprising a plurality of coplanar plate segments having radial gaps between them, said shaft coupling comprising elastomeric bodies between corresponding plate segments and vulcanized to juxtaposed surfaces of said plate segments, the plate segments being composed of metal sheet having at least main surfaces of the sheet which constitute the axial surfaces thereof formed as nonmachined faces; and blocking elements at said radial gaps coupling the plate segments of each half together across the respective gap and bracing the plate segments against axial deformation, each of said blocking elements being connected to one of said plate segments at an edge of the respective plate segment and extending across the respective gap to engage over a neighboring plate segment.

2. A shaft coupling with high torsional elasticity for connecting a drive with a driven unit, said shaft coupling having a first generally annular coupling half connected to said drive and a second generally annular coupling half connected to said driven unit, each of said coupling halves comprising a plurality of coplanar plate segments having radial gaps between them, said shaft coupling comprising elastomeric bodies between corresponding plate segments and vulcanized to juxtaposed surfaces of said plate segments, the plate segments being composed of metal sheet having at least main surfaces of the sheet which constitute the axial surfaces thereof formed as nonmachined faces; and blocking elements at said radial gaps coupling the plate segments of each half together across the respective gap and bracing the plate segments against axial deformation, said blocking elements being disposed at respective edges of the plate segments and extending cross the respective gaps to engage a neighboring plate segment whereby the blocking elements mutually brace the plate segments against axial deformation.

3. The shaft coupling defined in claim 1 wherein said plate segments are composed of steel sheet.

4. The shaft coupling defined in claim 1 wherein all of said elastomeric bodies are vulcanized between the respective plate segments together.

5. A shaft coupling with high torsional elasticity for connecting a drive with a driven unit, said shaft coupling having a first generally annular coupling half connected to said drive and a second generally annular coupling half connected to said driven unit, each of said coupling halves comprising a plurality of coplanar plate segments having radial gaps between them, said shaft coupling comprising elastomeric bodies between corresponding plate segments and vulcanized to juxtaposed surfaces of said plate segments, the plate segments being composed of metal sheet having at least main surfaces of the sheet which constitute the axial surfaces thereof formed as nonmachined faces; and blocking elements at said radial gaps coupling the plate segments of each half together across the respective gap and bracing the plate segments against axial deformation, at least one of said blocking elements comprising a pair of lugs, each of said lugs being affixed to one of said plate segments and reaching over a neighboring plate segment in a peripheral direction.

6. The shaft coupling defined in claim 5 wherein at least one of said blocking elements comprises two lugs which are affixed on opposite sides of one of said plate segments and has projecting portions straddling the neighboring plate segment.

7. The shaft coupling defined in claim 5 wherein said lugs are affixed on the same side of a plate segment and a neighboring plate segment to reach across a radial gap between said plate segments and axially brace said segments against one another.

8. The shaft coupling defined in claim 5 wherein said lugs are lugs are provided on the same plate segment.

9. The shaft coupling defined in claim 5 wherein said lugs are provided on plate segments on opposite sides of a respective radial gap.

10. The shaft coupling defined in claim 5 wherein said lugs are disposed so as to peripherally engage one another.

11. The shaft coupling defined in claim 5 wherein at least one of said lugs is connected to a respective plate segment by a fastener and is prevented from rotating by a pin transfixing said lug and the respective plate segment.

12. The shaft coupling defined in claim 5 wherein said lugs are provided along a periphery of the respective plate segments and are flush with said periphery.

13. The shaft coupling defined in claim 5 wherein said lugs conform to circular arc segments.

14. The shaft coupling defined in claim 5 wherein said lugs are coextensive with one another on opposite sides of a plate segment and are connected together by fasteners passing through a respective plate segment.

15. The shaft coupling defined in claim 3 wherein said plate segments are composed of steel sheet.

16. The shaft coupling defined in claim 2 wherein all of said elastomeric bodies are vulcanized between the respective plate segments together.

17. The shaft coupling defined in claim 5 wherein said plate segments are composed of steel sheet.

18. The shaft coupling defined in claim 5 wherein all of said elastomeric bodies are vulcanized between the respective plate segments together.

* * * * *